United States Patent [19]
Tani et al.

[11] Patent Number: 5,214,576
[45] Date of Patent: May 25, 1993

[54] COMPOUND CONTROL METHOD FOR CONTROLLING A SYSTEM

[75] Inventors: Tetsuji Tani; Tomoo Oyama; Takeshi Tsujimoto; Toshinari Tsuchihashi, all of Ichihara, Japan

[73] Assignee: Idemitsu Kosan Co., Ltd., Tokyo, Japan

[21] Appl. No.: 634,757

[22] Filed: Dec. 27, 1990

[30] Foreign Application Priority Data

Dec. 28, 1989 [JP] Japan .................................. 1-343339

[51] Int. Cl.⁵ ............................................. G05B 13/02
[52] U.S. Cl. .................................. 364/162; 364/184; 364/187
[58] Field of Search ............... 364/162, 157, 160, 161, 364/163, 184–187; 395/3, 900, 903, 904

[56] References Cited

U.S. PATENT DOCUMENTS

| | | | |
|---|---|---|---|
| 4,777,585 | 10/1988 | Kokawa et al. | 395/905 |
| 4,882,526 | 11/1989 | Iino et al. | 364/162 |
| 4,903,192 | 2/1990 | Saito et al. | 364/162 |
| 4,985,824 | 1/1991 | Husseiny et al. | 364/187 |
| 4,992,927 | 2/1991 | Araki | 364/162 |
| 5,043,862 | 8/1991 | Takahashi et al. | 364/162 |
| 5,091,844 | 2/1992 | Waltz | 364/162 |

*Primary Examiner*—Jerry Smith
*Assistant Examiner*—Thomas E. Brown
*Attorney, Agent, or Firm*—Hidaka and Benman

[57] ABSTRACT

A compound control method involves Proportional Plus Integral Plus Derivative Control (PID control) and Fuzzy Control. The method controls a system by inputting output data of the system to be controlled to a PID control operation so as to obtain a control variable from the PID control operation, inputting the output data also to a fuzzy operation so as to obtain a correcting variable from the fuzzy operation, correcting the control variable by the correcting variable so as to obtain a corrected control variable, and controlling the system by the corrected control variable.

5 Claims, 3 Drawing Sheets

COMPOUND CONTROL METHOD FOR CONTROLLING A SYSTEM

BACKGROUND OF THE INVENTION

1. Field of the Invention

The present invention relates to a compound control method for controlling a system, and particularly to a compound control method which is a combination of Proportional Plus Integral Plus Derivative Control (hereinafter referred to as "PID control") and Fuzzy Control.

2. Description of the Prior Art

In an automatic system control, the responsiveness and the stability are generally in a relationship contrary to each other. In other words, in order to obtain a speedy response in the control, the stability of the control has to be often sacrificed, and vice versa.

In a system where a PID control is most commonly used, if the gain is increased in order to obtain a speedy response, a hunting phenomenon or the like undesirable occurrence would cause the control system to be unstable.

On the other hand, the Fuzzy Systems Theory has been studied in various industrial fields recently. The studies on the Fuzzy System Theory and its applications have been actively pursued particularly in the fields of automatic system control.

Under the circumstance, there have been proposed several system control methods in which a combination of a PID control and a fuzzy control is used. A control method in which control parameters for the PID control are changed by a fuzzy inference has been proposed in, for example, Japanese Patent Application Laid-Open Gazettes 62-241,004, 62-241,005, 62-241,006, 63-123,102 and 63-247,801; and the Japanese magazine titled "KEI-SOH (Measurement and Instrument)", 1988, Vol. 31, No. 5, Pages 11 to 15 and 21 to 25.

In the methods disclosed in the above publications, input variables are first corrected by fuzzy controls and the corrected variables are used as PID control parameters. Then, only the outputs from the PID controls are used as the control variables to be inputted to the system to be controlled. The conventional methods, however, have a disadvantage in that the fuzzy control rules used in the fuzzy inference tend to become complicated and, therefore, some difficulties are liable to entail in their practical applications.

SUMMARY OF THE INVENTION

In the light of the above mentioned situation, an object of the present invention is to provide a system control method which has both a good responsiveness and an excellent control accuracy by means of a compound control method using simple fuzzy control rules.

The improvement in the present invention is basically achieved by correcting a control variable for controlling a control object by a correcting variable obtained from a fuzzy inference.

According to the present invention, there is provided a compound control method which includes the steps of inputting output data of the system to be controlled to a PID control operation so as to obtain a control variable from the PID control operation, inputting the output data of the system to be controlled also to a fuzzy operation so as to obtain a correcting variable from the fuzzy operation, and correcting the control variable by the correcting variable so as to obtain a corrected control variable so that the corrected control variable controls the system. The compound control method of the present invention enables a quick response because of the use of the PID control and a good stability in the response because of the use of the fuzzy inference. Thus, the compound control method of the present invention has made it possible to perform a system control with an improved responsiveness and a good stability, which has heretofore been considered difficult.

Other objects and features of the present invention will be apparent from the following description and drawings.

DESCRIPTION OF THE PREFERRED EMBODIMENTS

One of the embodiments of the compound control method according to the present invention will now be described. The embodiment is for regulating the temperature of a furnace for heating the starting materials used in a hydrogen producing plant.

Figure 1:
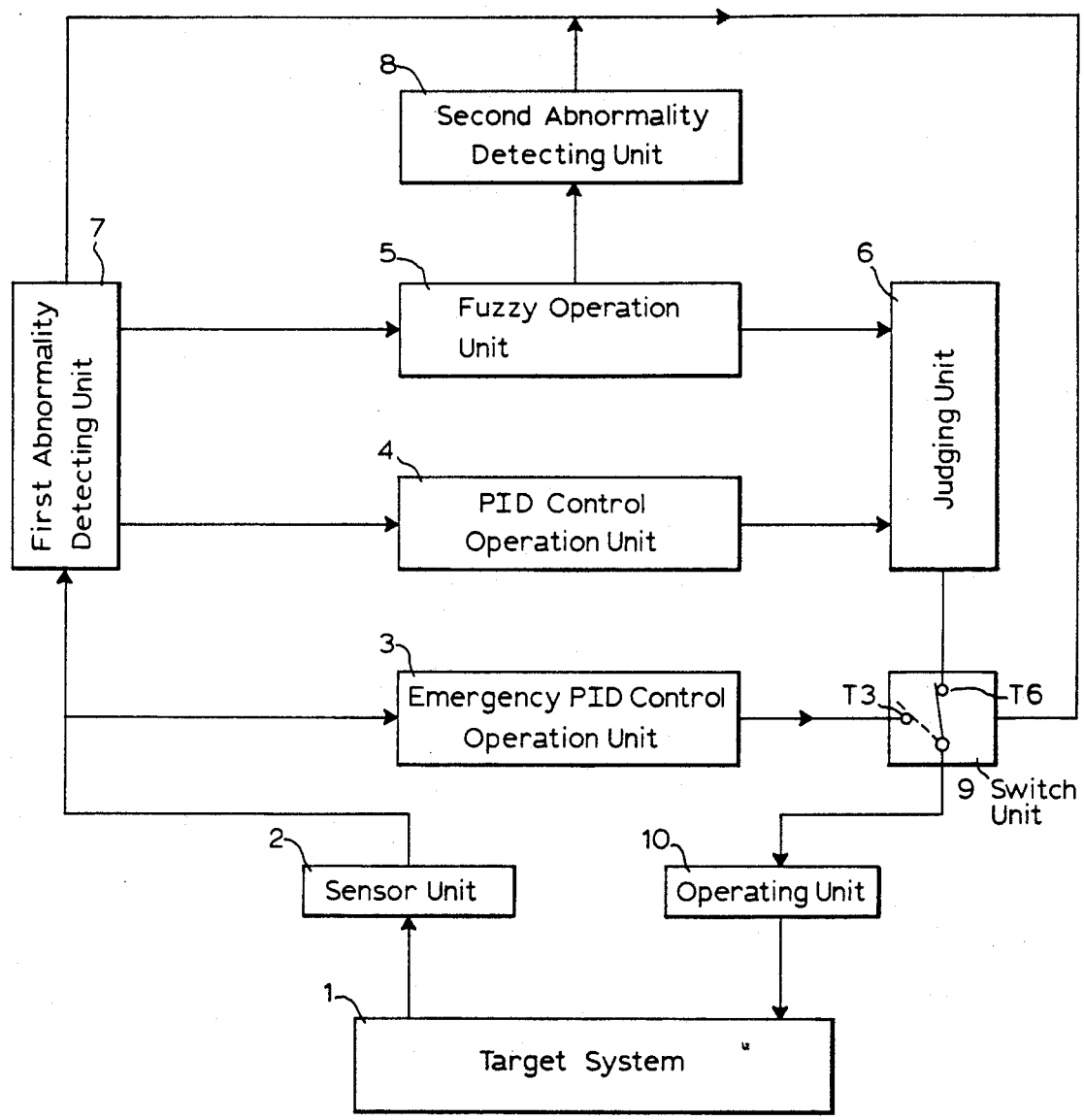
FIG. 1 is a block diagram representing a control system for carrying out a compound control method according to the present invention.

FIG. 1 is a block diagram representing a control system for carrying out a compound control method of the present invention. In FIG. 1, a target system 1 is the system to be controlled by the compound control method. The target system 1, in this embodiment, is the starting material heating furnace for the hydrogen producing plant. A sensor unit 2 measures the outlet temperatures of the target system 1 (i.e. the temperatures of the starting materials at the outlet of the furnace) and the temperatures of the exhaust gas of the target system 1 (i.e. the temperatures of the burnt fuel gas exiting from the furnace), which are the output data of the target system 1.

An emergency PID control operation unit 3 performs a PID control operation and outputs an emergency control variable, wherein the stability is given priority over the responsiveness. A PID control operation unit 4 performs a PID control operation and outputs a control variable, wherein the responsiveness is given priority over the stability. In this case, the responsiveness is increased to the extent that hunting would occur in the control system if the operation were performed only by the PID control operation unit 4. However, in the case of the present invention, the PID control operation unit 4 may have the same levels of responsiveness and stability as those of the emergency PID control operation unit 3.

A fuzzy operation unit 5 performs an operation to output a correcting variable based on a fuzzy inference. The outlet temperatures of the target system 1 may deviate from a predetermined target range if the target system 1 is controlled only by the PID control operation unit 4. Therefore, the fuzzy operation unit 5 is intended to perform a fuzzy inference operation and output a correcting variable which will correct the output of the PID control operation unit 4, i.e. the control variable, so that the outlet temperature of the target system 1 may not deviate from the predetermined target range. A judging unit 6 outputs a corrected control variable by combining (by means of addition, multiplication, etc.) the correcting variable received from the fuzzy operation unit 5 with the control variable received from the PID control operation unit 4. As a matter of course, the PID control operation performed in the PID control operation unit 4 is independent of the fuzzy inference operation performed in the fuzzy operation unit 5 because no output of the fuzzy operation unit 5 or the PID control operation unit 4 can be inputted to the other unit 4 or 5, respectively, as seen in the block diagram of FIG. 1. Therefore, naturally, the control variable and the correcting variable are obtained from the PID control operation unit 4 and the fuzzy operation unit 5, respectively, without being affected by the fuzzy operation and the PID control operation, respectively.

A first abnormality detecting unit 7 determines whether or not an outlet temperature of the target system 1 measured by the sensor unit 2 deviates from a predetermined controllable range. And if the first abnormality detecting unit 7 determines that the measured outlet temperature is deviated from a predetermined controllable range, the first abnormality detecting unit 7 transmits a switching signal to a switch unit 9.

A second abnormality detecting unit 8 determines whether or not any abnormality (such as a divisional operation where the denominator is zero) is detected in a fuzzy operation by the fuzzy operation unit 5. Upon determining a detection of an abnormality in the fuzzy operation, the second abnormality detecting unit 8 transmits a switching signal to the switch unit 9.

Upon receiving a switching signal from the first abnormality detecting unit 7 or the second abnormality detecting unit 8, the switch unit 9 performs a switching operation by setting the switch to the terminal T3 so as to transmit the output from the emergency PID control operation unit 3 to an operating unit 10 instead of the output from the judging unit 6.

In this embodiment, the operating unit 10 is a valve unit for regulating the quantity of the fuel gas to be supplied to the target system 1, which is the starting material furnace of the hydrogen producing plant. The valve unit is operable on the signals received through the switch unit 9 since it is equipped with a signal-to-power conversion unit. The arrowheaded line leading from the operating unit 10 to the target system 1 represents the fuel gas being supplied.

Based on the output of the judging unit 6 or the output of the emergency PID control operation unit 3 transmitted through the switch unit 9, the operating unit 10 regulates the quantity of the fuel gas to be inputted to the target system 1, thereby controlling the outlet temperature of the target system 1.

Figure 2:
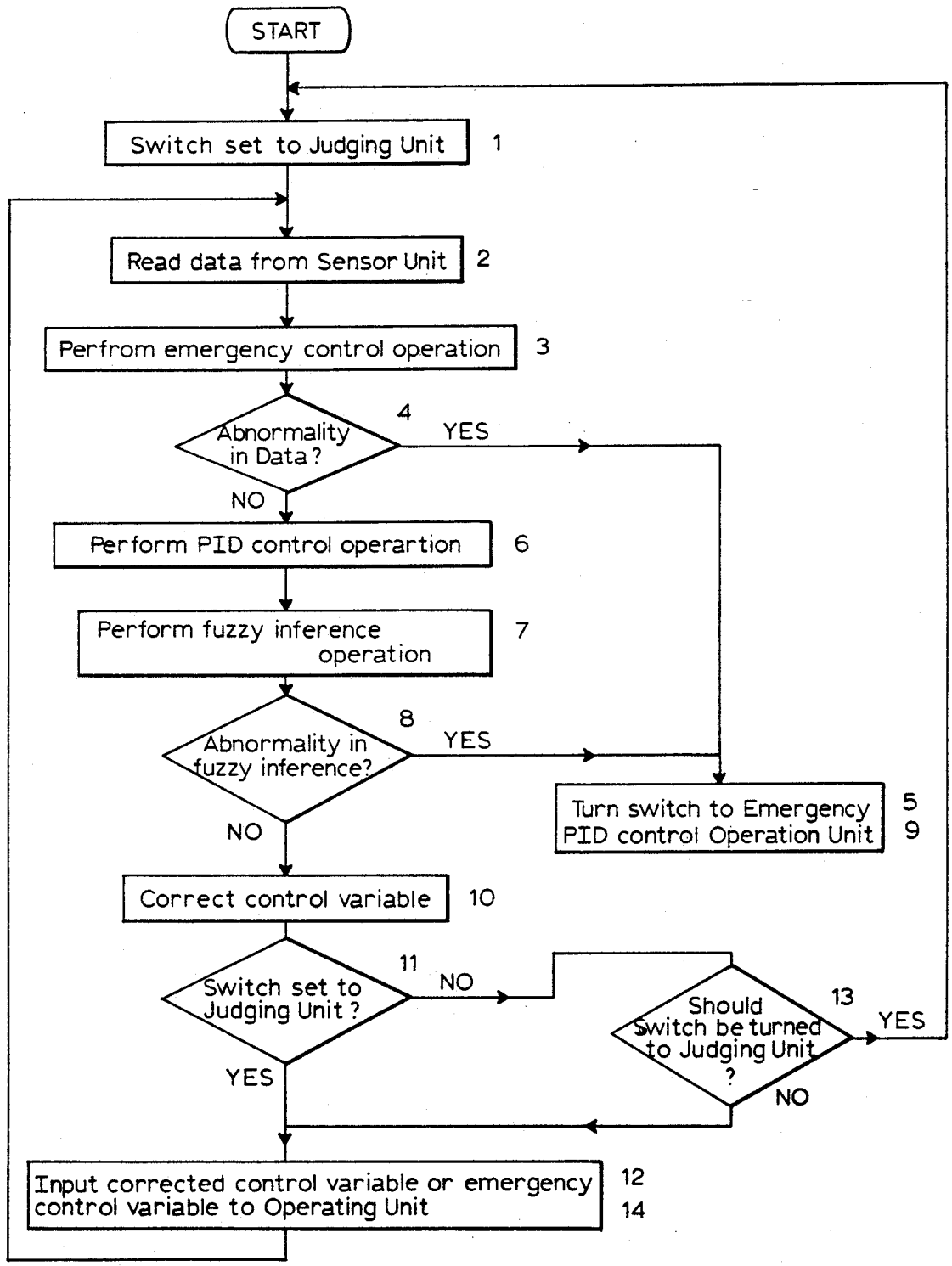
FIG. 2 is a program flow chart for the compound control method.
Figure 3A:
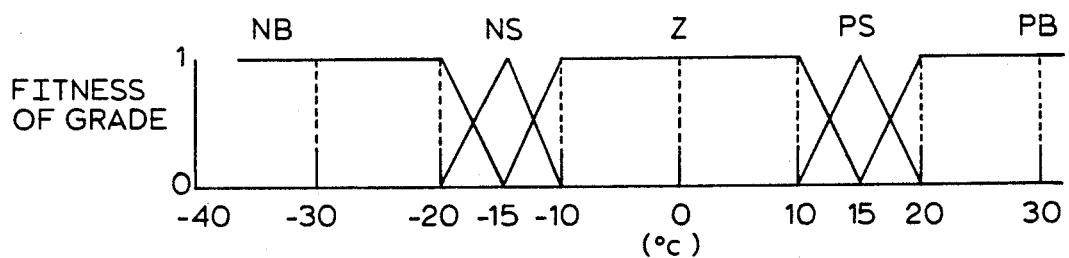
FIGS. 3(a) to 3(d) show the membership functions used in the embodiment described in reference to FIGS. 1 and 2.
Figure 3B:
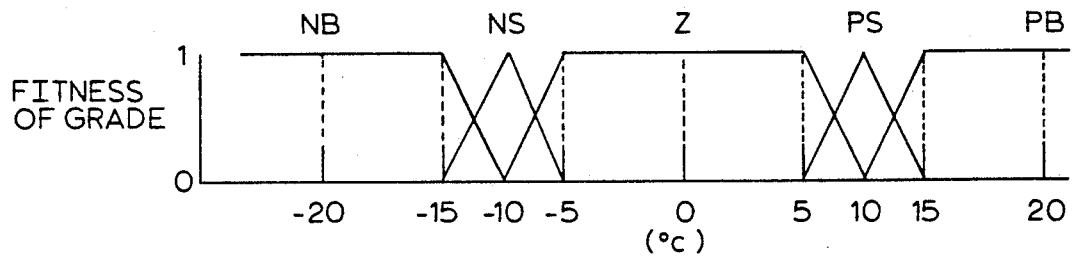
Figure 3C:
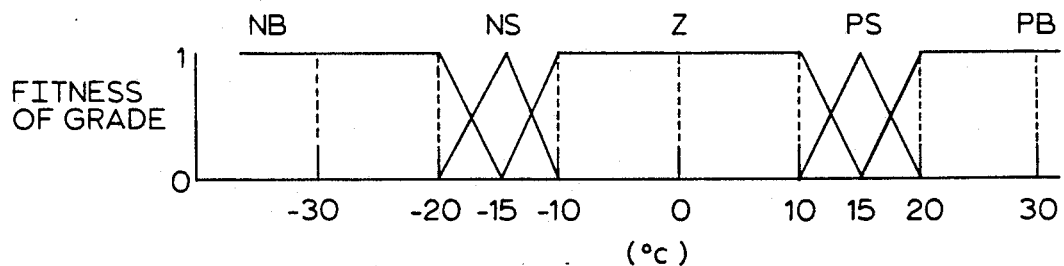
Figure 3D:
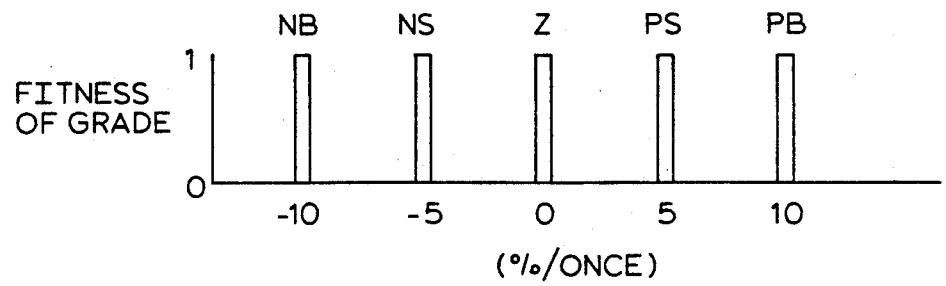

FIG. 2 is a program flow chart for the compound control method and FIGS. 3(a) to 3(d) show the membership functions used in this embodiment.

Now, the operational aspect of the compound control method will be explained step by step in reference to FIGS. 1, 2 and 3(a) to 3(d).

1. The switch unit 9 is set to the terminal T6 so that any signal outputted from the judging unit 6 is to be transmitted to the operating unit 10.

2. Through the sensor unit 2, data on the outlet temperature of the target system 1 are loaded to the emergency PID control operation unit 3 and data on both the outlet temperature and the exhaust gas temperature of the target system 1 are loaded to the first abnormality detecting unit 7.

3. A PID control operation for emergency is performed by the emergency PID control operation unit 3 so as to obtain a emergency control variable. (This emergency control variable is the output of the emergency PID control operation unit 3, which can be an input to the operating unit 10 through the switch unit 9.)

The emergency PID control operation is performed according to the following equation:

$$Y = K_P \left( Z + \frac{1}{T_I} \int_{\phi}^{t} Z dt + T_D \frac{dz}{dt} \right)$$

where,
Y: Emergency Control Variable
$K_P$: Proportional Sensitivity
$T_I$: Differentiation Time Interval
Z: Control Deviation (The deviation of the measured outlet temperature from a predetermined value)
$T_D$: Integration Time Interval In order to simplify the equation, the third term in the parenthesis may be omitted. The integration time interval (0 to t) of the second term in the parenthesis may be changed to an interval t' to t (where, $0 < t' < t$).

4. A judgement is made as to whether or not the data loaded to the first abnormality detecting unit 7 through the sensor unit 2 is satisfactory. In other words, the first abnormality detecting unit 7 determines whether or not the output data of the target system 1 transmitted from the sensor unit 2 are within the range workable in the PID control operation by the PID control operation unit 4 and in the fuzzy operation by the fuzzy operation unit 5.

5. If the loaded data are determined to have an abnormality by the first abnormality detecting unit 7, the first abnormality detecting unit 7 transmits a switching signal to the switch unit 9 so as to cause the switch 9 to be set to the terminal T3. Then, the emergency control variable outputted from the emergency control operation unit 3 will be transmitted to the operating unit 10 through the switch unit 9. In other words, if the output of the target system 1 is outside the range controllable by any of the fuzzy control operations, the system control is not performed by the PID control operation and the fuzzy operation but it is performed by the emergency PID control operation.

6. If the loaded data are determined to be normal (i.e. the output of the target system 1 is within the fuzzy controllable range), the output data of the target system 1 (i.e. the outlet temperature and the exhaust gas temperature of the furnace) are inputted to the PID control operation unit 4 and a control variable is calculated by the PID control operation unit 4 and is outputted therefrom. In order to improve the responsiveness in this PID control operation, the proportional sensitivity $K_P$, the differentiation time interval $T_I$ and the integration time interval $T_D$ are set to appropriate values. The calculation of the control variable is performed according to the following equation in the same manner as in the case of calculating an emergency control variable by the emergency PID control operation.

$$Y = K_p \left( Z + \frac{1}{T_I} \int_\phi^t Z dt + T_D \frac{dz}{dt} \right)$$

where,
Y: Control variable
$K_P$: Proportional Sensitivity
$T_I$: Differentiation Time Interval
Z: Control Deviation
$T_D$: Integration Time Interval The above equation can also be simplified as mentioned in the case of the calculation performed in the emergency PID control operation.

7. Further, in case the loaded data are determined to have no abnormality, the output data of the target system 1 (i.e. the outlet temperature and the exhaust gas temperature of the furnace) are also inputted to the fuzzy operation unit 5 and a correcting variable is obtained in the fuzzy operation unit 5 and is outputted therefrom. A fuzzy inference in this case is performed in the following manner.

The cycle period for using the fuzzy inference can be fixed, or may be varied as desired.

In the case of the furnace temperature control for the hydrogen production plant, the membership functions as shown in FIGS. 3(a) to 3(d) are defined so as to quantitatively evaluate the following values.

T: Deviation of the outlet temperature of the target system (the furnace) from a predetermined value DT: Difference between the currently measured and the last measured outlet temperatures of the target system (The temperature sampling cycle period may be from a few seconds to a few minutes. In this embodiment, one minute.)

DTF: Difference between the currently measured and the last measured exhaust gas temperatures of the target system (The temperature sampling cycle period is the same as for DT)

MV: Corrected control variable for regulating the amount of opening of the fuel gas control valve. (This variable is the output from the judging unit 6, which is the control variable outputted from the PID control operation unit 4 having been corrected by the correcting variable outputted from the fuzzy operation unit 5.)

In FIGS. 3(a) to 3(d), PB, PS, NB, NS and Z are defined as follows:
PB: Greater in the positive
PS: Smaller in the positive direction
NB: Greater in the negative direction
NS: Smaller in the negative direction
Z: Close to zero One of the examples to prepare fuzzy control rules using the membership functions is shown below:
If T is PS and DT is PB, then MV is NS.
If T is PB and DTF is NB, then MV is Z.
If T is PB and DTF is Z, then MV is NS.
If T is PS and DT is NS, then MV is Z.
If T is PB and DTF is PB, then MV is NB.

Then, the correcting variable is obtained based on these values.

8. While the correcting variable is being obtained using the fuzzy inference, the second abnormality detecting unit 8 determines whether or not there is an abnormality in the fuzzy inference operation such as a divisional operation where the denominator is zero.

9. If it is determined that an abnormality is detected in the fuzzy inference operation, the second abnormality detecting unit 8 transmits a switching signal to the switch unit 9 so as to cause the switch unit 9 to be set to the terminal T3 so that the emergency control variable outputted from the emergency PID control operation unit 3 is transmitted to the operating unit 10.

10. On the other hand, if it is determined that no abnormality is detected in the fuzzy inference operation, the judging unit 6 corrects the control variable received from the PID control operation unit 4 by adding the correcting variable received from the fuzzy operation unit 5 to the control variable or by multiplying the control variable by the correcting variable. The judging unit 6 then outputs a corrected control variable.

11. The switch unit 9 is checked as to whether or not the switch is set to the terminal T6 so that the judging unit 6 is connected to the operating unit 10.

12. If the switch unit 9 is set to the terminal T6 (i.e. the judging unit is connected to the operating unit 10), the corrected control variable outputted from the judging unit 6 is transmitted to the operating unit 10, whereby the quantity to be input to the target system 1 is regulated. Since, in this embodiment, the operating unit 10 represents the fuel gas control valve, the corrected control variable transmitted from the judging unit 6 causes the fuel gas control valve (the operating unit 10) to be adjusted for a proper amount of opening, thereby further causing the quantity of the fuel gas being supplied to the starting material furnace (the target system 1) to be regulated.

13. If the switch unit 9 is not set to the terminal T6 to be connected to the judging unit 6, a judgement is made as to whether or not the switch unit 9 should be turned over to the terminal T6 to be connected to the judging unit 6. If no abnormality signal is present, the switch is turned over to the terminal T6 to be connected to the judging unit 6. Then, the above steps 2 through 12 are repeated.

14. If, on the other hand, an abnormality signal is determined to be present, the switch unit 9 will not be turned over to the terminal T6. In this case, the emergency control variable outputted from the emergency control operation unit 3 is transmitted to the operating unit 10 so as to regulate the quantity to be inputted to the target system 1 as mentioned in the above step 12.

As described above, a control method having both high responsiveness and good stability can be achieved by improving the responsiveness by the PID control operation and by correcting any instability caused by the improvement in the responsiveness by using the fuzzy operation.

In addition, the compound control method of the present invention is not only applied to the above embodiment, but it can also be applied to an embodiment wherein the responsiveness is improved by a fuzzy operation and the stability is improved by a PID control operation. The compound control method of the present invention can further be applied to another embodiment wherein an emergency PID control operation and a PID control operation are performed by a single PID control operation unit.

It goes without saying that the compound control method of the present invention is applicable to various systems to be controlled other than a starting material furnace for a hydrogen production plant.

What is claimed is:

1. A method of controlling a system, comprising the steps of:
   (a) inputting output data of said system to be controlled to a PID control operation unit so as to perform a PID control operation to obtain a control variable from said PID control operation unit;
   (b) inputting said data obtained from said system to be controlled to a fuzzy operation unit so as to perform a fuzzy operation to obtain a correcting variable from said fuzzy operation unit; wherein said PID control operation and said fuzzy operation are independent of each other, whereby said control variable and said correcting variable are obtained from said PID control operation unit and said fuzzy operation unit, respectively, without being affected by said fuzzy operation and said PID control operation, respectively;
   (c) inputting said control variable and said correcting variable to a judging unit;
   (d) correcting said control variable by said correcting variable in said judging unit so as to obtain a corrected control variable from said judging unit; and
   (e) inputting said corrected control variable to said system so as to control said system.

2. A method of controlling a system according to claim 1, further comprising a step of determining that no abnormality is detected in said fuzzy operation before said step of correcting said control variable by said correcting variable obtained from said fuzzy operation.

3. A method of controlling a system, comprising the steps of:
   (a) inputting output data of said system to be controlled to a PID control operation unit so as to perform a PID control operation to obtain a control variable from said PID control operation unit;
   (b) determining that said data obtained from said system are within a fuzzy controllable range in a fuzzy operation;
   (c) inputting said data obtained from said system to a fuzzy operation unit after said step of determining that said data obtained from said system are within a fuzzy controllable range so as to perform a fuzzy operation to obtain a correcting variable from said fuzzy operation unit; wherein said PID control operation and said fuzzy operation are independent of each other, whereby said control variable and said correcting variable are obtained from said PID control operation unit and said fuzzy operation unit, respectively, without being affected by said fuzzy operation and said PID control operation, respectively;
   (d) inputting said control variable and said correcting variable to a judging unit;
   (e) correcting said control variable by said correcting variable in said judging unit so as to obtain a corrected control variable from said judging unit; and
   (f) inputting said corrected control variable to said system so as to control said system.

4. A method of controlling a system according to claim 3, further comprising a step of determining that no abnormality is detected in said fuzzy operation before said step of correcting said control variable by said correcting variable.

5. A method of controlling a system, comprising the steps of:
   (a) inputting output data of said system to be controlled to a first abnormality detecting unit;
   (b) determining in said first abnormality detecting unit that said output data are normal and within a fuzzy controllable range;
   (c) inputting said output data to a PID control operation unit so as to perform a PID control operation to obtain a control variable from said PID control operation unit;
   (d) inputting said output data to a fuzzy operation unit so as to perform a fuzzy operation to obtain a correcting variable from said fuzzy operation unit; wherein said PID control operation and said fuzzy operation are independent of each other, whereby said control variable and said correcting variable are obtained from said PID control operation unit and said fuzzy operation unit, respectively, without being affected by said fuzzy operation and said PID control operation, respectively;
   (e) determining in a second abnormality detecting unit that no abnormality is detected in said fuzzy operation;
   (f) inputting said control variable and said correcting variable to a judging unit;
   (g) correcting said control variable by said correcting variable in said judging unit so as to obtain a corrected control variable from said judging unit; and
   (h) inputting said corrected control variable to said system so as to control said system.

* * * * *